(12) United States Patent
Dayka et al.

(10) Patent No.: US 9,268,952 B2
(45) Date of Patent: Feb. 23, 2016

(54) SCALABLE PRECOMPUTATION SYSTEM FOR HOST-OPAQUE PROCESSING OF ENCRYPTED DATABASES

(71) Applicant: International Business Machines Corporation, Armonk, NY (US)

(72) Inventors: John C. Dayka, New Paltz, NY (US); Elaine R. Palmer, Hanover, NH (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 13/768,568

(22) Filed: Feb. 15, 2013

(65) Prior Publication Data

US 2014/0237257 A1 Aug. 21, 2014

(51) Int. Cl.
*G06F 17/30* (2006.01)
*G06F 21/60* (2013.01)
*G06F 21/62* (2013.01)

(52) U.S. Cl.
CPC ........ *G06F 21/602* (2013.01); *G06F 17/30442* (2013.01); *G06F 17/30451* (2013.01); *G06F 21/6227* (2013.01)

(58) Field of Classification Search
CPC .................... G06F 17/30935; G06F 17/30938; G06F 17/30911
See application file for complete search history.

(56) References Cited

U.S. PATENT DOCUMENTS

| | | | |
|---|---|---|---|
| 5,855,018 A | | 12/1998 | Chor et al. |
| 6,983,287 B1 * | | 1/2006 | Jayanti et al. |
| 7,620,625 B2 | | 11/2009 | Ramzan et al. |
| 8,229,939 B2 | | 7/2012 | Staddon et al. |
| 8,447,757 B1 * | | 5/2013 | Cox ............................... 707/720 |
| 2005/0147246 A1 * | | 7/2005 | Agrawal et al. .................. 380/44 |
| 2005/0240991 A1 * | | 10/2005 | Dombkowski et al. ......... 726/11 |
| 2006/0155679 A1 * | | 7/2006 | Kothuri et al. ..................... 707/3 |
| 2007/0240224 A1 | | 10/2007 | Agrawal et al. |
| 2008/0235476 A1 * | | 9/2008 | Goodman et al. ............ 711/163 |
| 2011/0191584 A1 | | 8/2011 | Trostle et al. |
| 2012/0143873 A1 * | | 6/2012 | Saadat ........................... 707/741 |
| 2013/0073573 A1 | | 3/2013 | Huang et al. |

OTHER PUBLICATIONS

Chen, Chun-Hua "One-Server Private Information Retrieval Scheme with Mutual Authentication Capability", Institute of Computer Science, National Chung-Hsing University, 1995, pp. 1-14.

(Continued)

*Primary Examiner* — Sangwoo Ahn
(74) *Attorney, Agent, or Firm* — Cantor Colburn LLP; William A. Kinnaman, Jr.

(57) ABSTRACT

A method, system, and computer program product to generate results for a query to an encrypted database stored on a host are described. The method includes generating indexes from the encrypted database, each index identifying records of the encrypted database associated with a range of data for at least one field stored in the records of the encrypted database, and generating index metadata associated with each index, the index metadata indicating the range of data identified by the associated index. The method also includes generating a sub-query from the query for each field associated with the query and determining a subspace of search within the encrypted database based on sub-query results obtained through the index metadata. The method further includes searching the subspace of the encrypted database to generate the results of the query.

9 Claims, 5 Drawing Sheets

(56) References Cited

OTHER PUBLICATIONS

Dang et al., "Extreme Security Protocols for Outstanding Database Services", Proc. of the 6th International Conference on Information Integration and Web-based Applications and Services—iiWAS 2004, Jakarta, Indonesia, Sep. 27-29, 2004, pp. 497-506.

Olumofin et al., "Preserving Access Privacy Over Large Databases" Tech. Report CACR 2010-33, University of Waterloo, 2010, pp. 1-16.

Olumofin et al., "Privacy-preserving Queries over Relational Databases" Proc. of the 10th International Conference on Privacy Enhancing Technologies (PETS•10), Berlin, Germany, LNCS, vol. 6205, pp. 75-92, Springer-Verlag, Jul. 2010.

Wang et al., "Private Information Retrieval Using Trusted Hardware", 11th European Symposium on Research in Computer Security (ESORICS), 2006, pp. 1-18.

* cited by examiner

SCALABLE PRECOMPUTATION SYSTEM FOR HOST-OPAQUE PROCESSING OF ENCRYPTED DATABASES

BACKGROUND

The present invention relates generally to database queries, and more specifically, to queries of encrypted databases.

In many systems including databases of encrypted information such as financial and medical databases, for example, substantial parts of the databases must be decrypted only by secure hardware because of regulatory or other reasons. These encrypted databases are considered host-opaque because even the host that stores the database may not access the database contents. Instead, only one or more secure processors (secure coprocessors) may access the database. In such systems, when the database size exceeds the total capacity of the secure coprocessors, a large latency can result in conducting a traditional search. This can be especially true when data mining encrypted databases because data mining generally involves searching for correlations between different properties of database records.

SUMMARY

According to one embodiment of the present invention, a method of generating results for a query to an encrypted database stored on a host includes generating, with a first processor, indexes from the encrypted database, each index identifying records of the encrypted database associated with a range of data for at least one field stored in the records of the encrypted database; generating, with the first processor, index metadata associated with each index, the index metadata indicating the range of data identified by the associated index; generating, with a second processor, a sub-query from the query for each field associated with the query; determining, with the first processor and the second processor, a subspace of search within the encrypted database based on sub-query results obtained through the index metadata; and searching, with the first processor, the subspace of the encrypted database to generate the results of the query.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, searching or data mining large encrypted databases can result in large latencies when the database size exceeds the total capacity of the secure coprocessors that are required to decrypt the databases. Embodiments of a system and method are described herein that address searching encrypted databases. Specifically, a scalable pre-computation system facilitates scaling for any size of encrypted database by pre-computing or pre-filtering contents to a level accessible even by an untrusted host.

Figure 1:
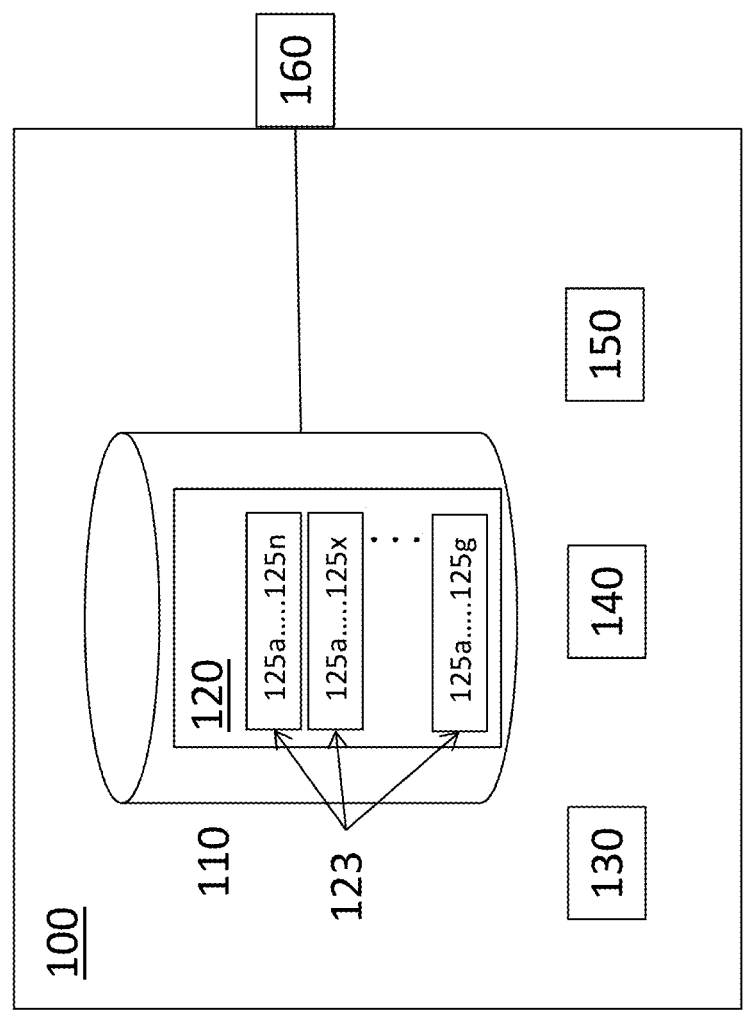
FIG. 1 is a block diagram of a system to search an encrypted database according to an embodiment of the invention.

FIG. 1 is a block diagram of a system to search an encrypted database 120 according to an embodiment of the invention. The system includes a host 100. The host 100 may be an untrusted host, meaning that the host 100 may store but not access the contents of an encrypted database 120 stored in a memory device 110 of the host 100. The encrypted database 120 may have any structure for organizing the records 123 that comprise the database 120 and is further detailed with reference to FIG. 5 below. Each of the records 123 may include one or more fields 125 of information. The host 100 may also include an interface 130 by which a search may be entered, for example, one or more processors 140, and an output device 150 which may include, for example, a display or a network communication port. One or more secure processors 160 are part of or interface with the host 100. The secure coprocessors 160 (when more than one secure processor 160 is available) form one or more "trust domains," which are groups of devices with synchronized symmetric keys. Devices within the same group are essentially interchangeable and are afforded the same level of trust. Synchronized coprocessors 160 offer scalable aggregate performance. However, as noted above, even with the aggregation of processing power afforded by multiple processors 160, a user-tolerated response time may be infeasible when a large secured database 120 must be searched. Exemplary embodiments of the process used to facilitate a search of the database 120 are detailed below.

Figure 2:
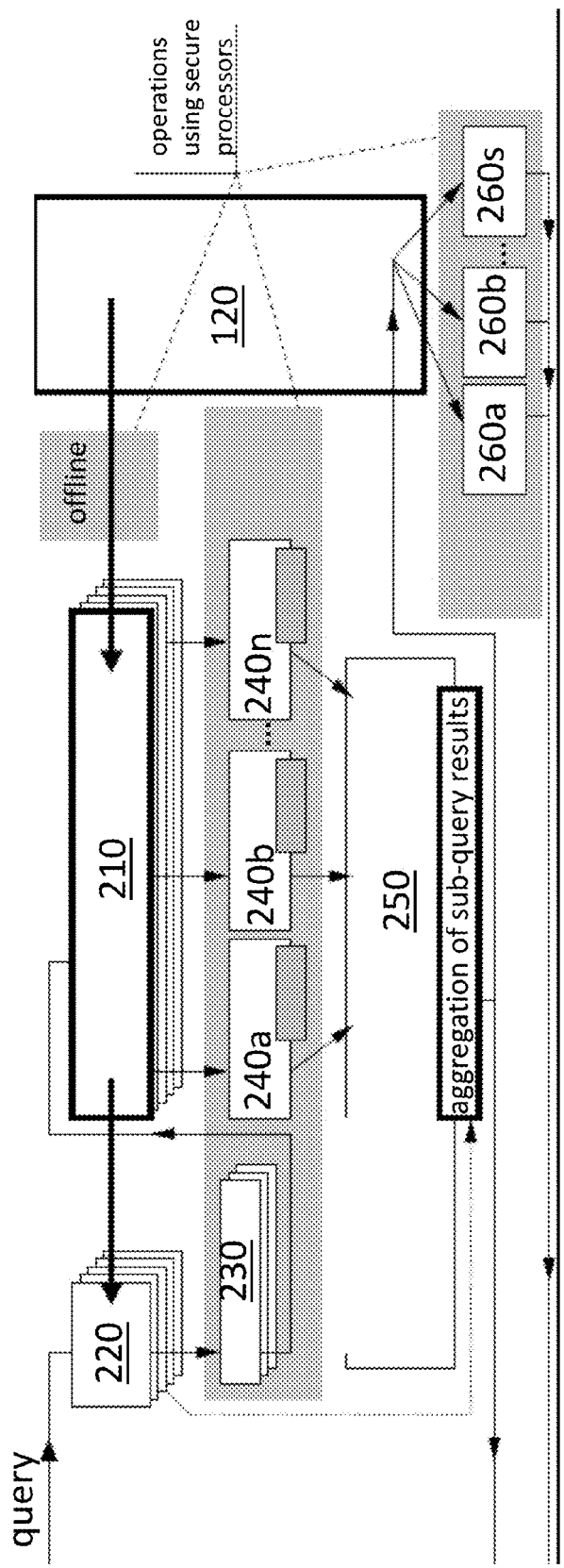
FIG. 2 is a data flow diagram of a query operation according to an embodiment of the invention.

FIG. 2 is a data flow diagram of a query operation according to an embodiment of the invention. From the encrypted database 120 of interest, a set of encrypted indexes 210 is generated and may be stored in the memory device 110 of the host 100. The indexes may be generated by the secure processors 160 offline prior to the query being received. Each index 210 may be a single or multi-field 125 (combined) index 210, and indexes 210 may be redundant. For example, if a database 120 of financial transactions is considered, one index 210 (A) may indicate records 123 related to transactions of $0-$50. Another index 210 (B) may indicate records 123 related to transactions of $25-$75 and that occurred between Jun. 1, 2012 to Dec. 31, 2012. Yet another index 210 (C) for the same exemplary database 120 may indicate records 123 related to transactions that occurred between Jan. 1, 2012 to Dec. 31, 2012. Thus, index 210 (A) is a single field 125 index 210 as is index 210 (C). Index 210 (B) is a combined field 125 index 210 that combines a range of transaction values and dates of the transactions. Both index 210 (A) and index 210 (C) have some redundancy with records 123 indicated by index 210 (B). In the case of index 210 (A), the transaction amounts from $25 to $50 overlap, and in the case of index (C), the transaction dates from Jun. 1, 2012 to Dec.

31, 2012 overlap with those of index 210 (B). In generating the indexes 210, the record 123 structure may be considered, as well as frequency query types. For example, if transaction amounts are often queried in conjunction with transaction dates, more combined indexes 210 may be generated combining amount and date field 125 ranges.

Each index 210 is associated with respective index metadata 220 that, unlike the secure database 120 and indexes 210, is viewable by the host 100. The index metadata 220, like the indexes 210, may be generated offline prior to any query being received. To be clear, the generation of indexes 210 and corresponding index metadata 220 may be regarded as preprocessing rather than query processing. This preprocessing—especially the generation of indexes 210, which may require filtering of the full database 120 multiple times—facilitates the scalability and reduction of latency for subsequent queries as detailed below. The index metadata 220 gives insight into the records 123 associated with each index 210. The metadata 220 need not identify records 123 like the index 210 but can be thought of as a guide or directory to the index 210 summarizing the contents of the records 123 included in the index 210. For example, the metadata 220 associated with index 210 (A) in the example described above would indicate that records 123 related to transaction amounts of $0 to $50 are included in the index 210 (A). When a query is received by the host 100, rather than searching through the entire database 120 using the secure processors 160, the host 100 breaks down the query into sub-queries that may be used to search the metadata 220 information. For example, considering an encrypted database 120 of financial transaction records 130 again, assume that the query is "transactions between $25 and $50 made in January and February of 2012." Then the query may be broken down into transactions between $25 and $50 and transactions made in January and February of 2012. Each of those two sub-queries could be searched with the index metadata 220 rather than by having to search the encrypted indexes 210 of encrypted database 120. The sub-query of the metadata 220 results in sub-query indexes 230 which are any indexes 210 that match any of the sub-queries. The sub-query indexes 230 are processed by the secure processors 160 in the manner detailed with reference to FIG. 3 and yield the intermediate results 240 and the sub-query output 250, which identifies the search subspace of interest or the subset of the records 123 of the database 120 that should be searched by the processors 160 with the original query to generate the query output 260.

Figure 3:
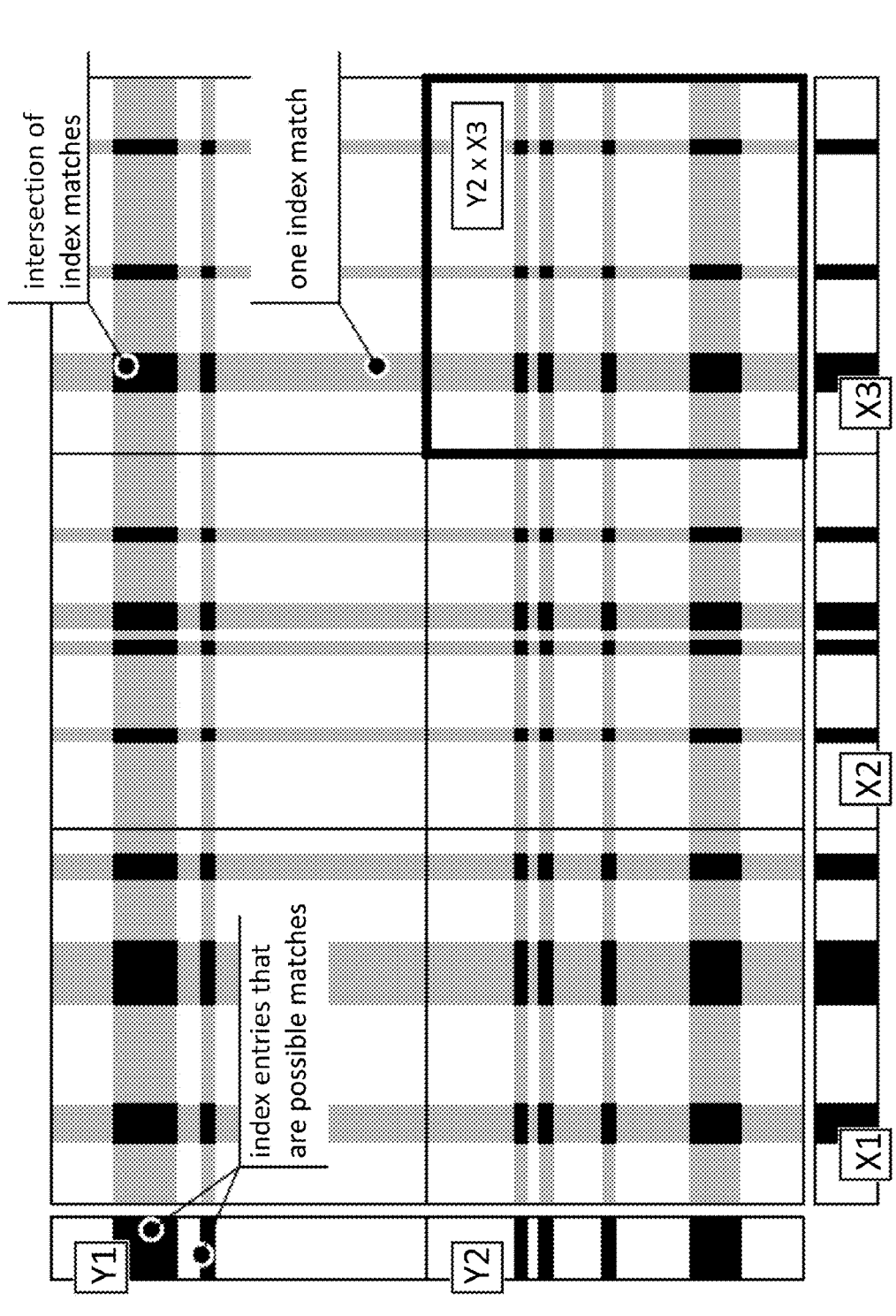
FIG. 3 illustrates exemplary sub-query indexes used to generate the sub-query output according to an embodiment of the invention.

FIG. 3 illustrates exemplary sub-query indexes 230 used to generate the sub-query output 250 according to an embodiment of the invention. Sub-query indexes 230 Y1 and Y2 may relate to transaction time. Continuing the example discussed with reference to FIG. 2 (exemplary query of transactions between $25 and $50 made in January and February of 2012), Y1 and Y2 are indexes 210 that include transaction records 123 for January and February of 2012. Sub-query indexes 230 X1, X2, and X3 are indexes 210 that include transaction records 123 with amounts between $25 and $50. The gray bars shown in FIG. 3 represent the records that fit one of the sub-query criteria, and the black blocks represent the intersection of sub-queries. For example, one of the gray rows associated with index 210 Y1 may indicate one or more records 123 of transactions in January, 2012, while one of the gray columns associated with index 210 X3 (indicated as "one index match") may indicate one or more records 123 associated with transactions for amounts between $30 and $35. The intersection of those two gray lines (indicated as "intersection of index matches") is a black box that represents a subset of records 123 that meet both the transaction amount and transaction time criteria of the query. The black boxes in FIG. 3 result in the sub-query output 250, which is a bit vector for each of the sub-query indexes 230 that indicates the records within those sub-query indexes 230 where the query criteria intersect. This process of determining the intersection of query criteria relating to different fields 125 is necessary when the query involves two fields 125 (transaction amount and transaction date) as in the example discussed above and is also used when the query involves three or more fields 125. However, when the query involves only one field 125, the sub-query and query are the same and a search (by the host 100 rather than the secure processors 160) of the metadata 220 is sufficient to identify the sub-query output 250 or records 123 for search by the secure processors 160 without additionally determining the intersection of fields 125.

Figure 4:
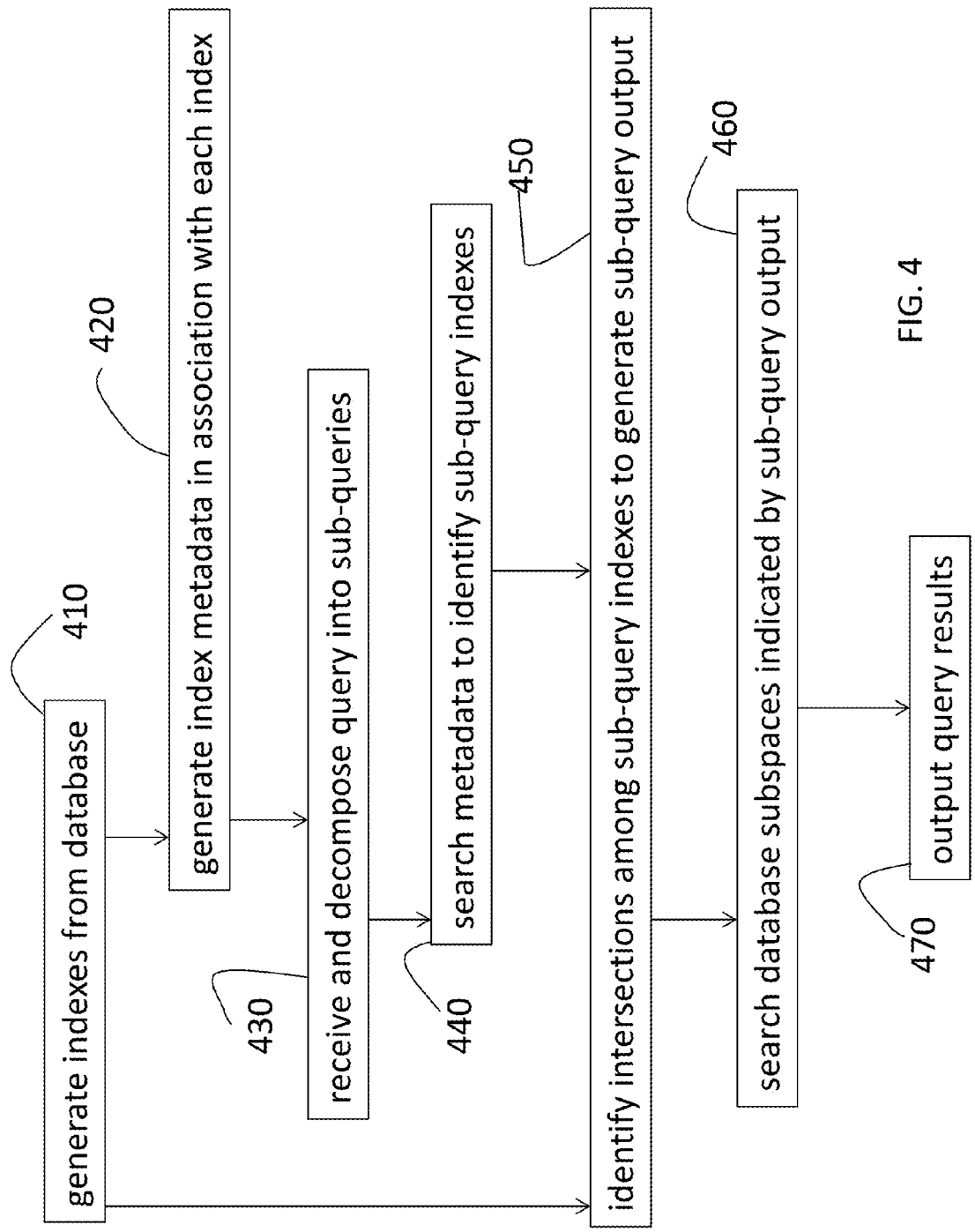
FIG. 4 is a flow diagram of a method of outputting query results for a query of an encrypted database according to an embodiment of the invention.

FIG. 4 is a flow diagram of a method of outputting query results for a query of an encrypted database according to an embodiment of the invention. At block 410, generating indexes 210 from the database 120 is done offline by secure processors 160, according to embodiments of the invention, to reduce latency associated with a subsequent database 120 query. Generating index metadata 220 in association with each index 120 at block 420 is also done offline. Because the metadata 220 only provides a guide or directory to the contents of the associated index 210, the metadata 220 is accessibly by the non-secure host 100 that may store the encrypted database 120. Receiving and decomposing a query into sub-queries at block 430 facilitates the host 100 processor 140 (rather than the secure processor 160) searching the metadata 220 to identify sub-query indexes 230 at block 440. A sub-query refers to a query of a single field 125, because a query may specify search criteria for two or more fields 125. The sub-query indexes 230 identify indexes with potential matches to the query. The secure processors 160 use the sub-query indexes 230 for identifying intersections among the sub-query indexes 230 to generate sub-query output 250 at block 450. That is, indexes 210 (from step 410) that are identified as sub-query indexes 230 are cross-referenced (when the query involves more than one field) to generate the sub-query output 250 as discussed with reference to FIG. 3. When the sub-query output 250 has been generated and indicates the subspaces of the database 120 that must be searched in detail, the secure processors 160 perform searching the database 120 subspaces indicated by the sub-query output 250 at block 460. Outputting the query results at block 470 is a scalable process because of the indexing and the pre-computation of the intersection spaces.

Figure 5:
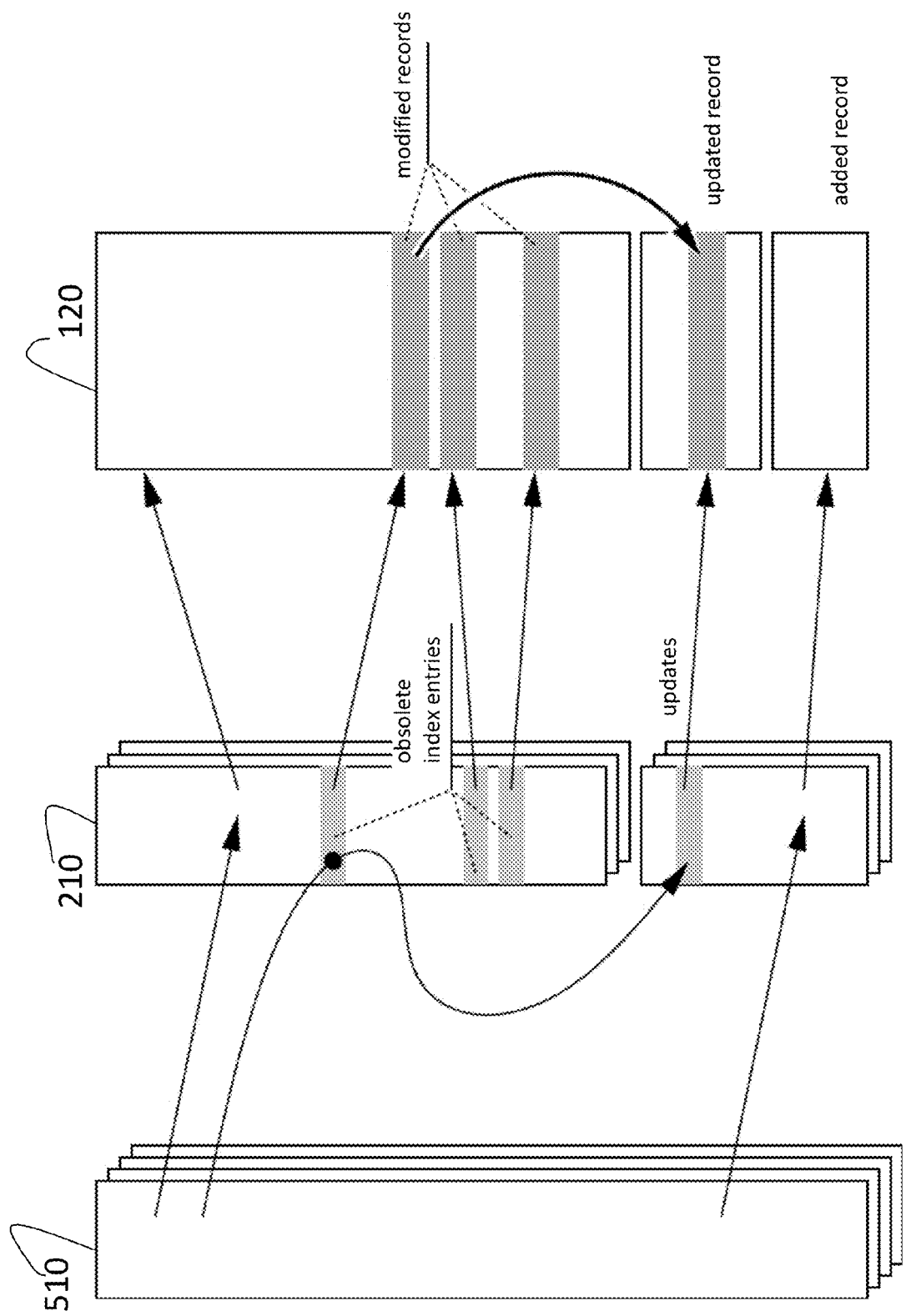
FIG. 5 illustrates incremental indexing of a database according to an embodiment of the invention.

FIG. 5 illustrates incremental indexing of a database according to an embodiment of the invention. The database 120 according to embodiments of the invention need not be static or read-only. However, the scalability and efficiency of the pre-computation (done through the use of the metadata 220) are affected by frequent changes in the database 120 because of the need for re-indexing. In embodiments of the invention, the database 120 is "append only," meaning that records may be added from time to time, but changes necessitating re-indexing do not occur. FIG. 5 shows a meta-index 510 that may combine multiple indexes 210 as a way to preliminarily filter the database 120 entries. FIG. 5 shows that the meta-index 510 may include an updated portion of an index 210, added since the last indexing. Also, updated records may be located in no more than two lookups using the meta-index 510, as shown in FIG. 5.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of generating results for a query to an encrypted database stored on a host, the method comprising:
   generating, with a first processor, encrypted indexes from records stored in the encrypted database, each encrypted index identifying the records of the encrypted database associated with a range of data for at least one field stored in the records of the encrypted database;
   generating, with the first processor, unencrypted index metadata associated with each encrypted index, each unencrypted index metadata indicating each field and the range of data within each field identified by the associated encrypted index;
   generating, with a second processor, a sub-query from the query for each field associated with the query, each sub-query being a portion of the query specific to the corresponding field;
   determining, with the first processor and the second processor, a subspace of search within the encrypted database based on sub-query results obtained by searching the unencrypted index metadata with each sub-query, the sub-query results indicating sub-query indexes; and
   searching, with the first processor, the subspace of the encrypted database associated with the sub-query indexes to generate the results of the query.

2. The method according to claim 1, wherein the generating the encrypted indexes and the unencrypted index metadata with the first processor is with a secure processor.

3. The method according to claim 1, wherein the generating the encrypted indexes and the unencrypted index metadata is done offline prior to receiving the query.

4. The method according to claim 1, wherein the generating the sub-query with the second processor is with a host processor, and the encrypted database and the encrypted indexes are not accessible to the host processor.

5. The method according to claim 1, wherein the determining the subspace of search includes searching the unencrypted index metadata for each sub-query to identify sub-query indexes, the sub-query indexes being encrypted indexes that meet the criteria of each associated sub-query.

6. The method according to claim 5, wherein the identifying the sub-query indexes is with the second processor.

7. The method according to claim 5, further comprising obtaining the sub-query results as an intersection of the sub-query indexes associated with different fields when the query is associated with two or more fields.

8. The method according to claim 7, wherein the obtaining the sub-query results and searching the subspace are done by the first processor.

9. The method according to claim 5, further comprising obtaining the sub-query results as the sub-query indexes when the query is associated with one field.

* * * * *